US007249683B2

(12) United States Patent
Smith et al.

(10) Patent No.: US 7,249,683 B2
(45) Date of Patent: Jul. 31, 2007

(54) SPACE SAVING SWIVEL BLOCK UTENSIL HOLDER

(75) Inventors: Dustin G. Smith, Black Rock, AR (US); Bryan Butts, Walnut Ridge, AR (US); Jeffrey S. Hollister, Paragould, AR (US); Ronald J. Reinke, Walnut Ridge, AR (US); William F. Wilcoxson, Walnut Ridge, AR (US); Ted Thompson, Imboden, AR (US); Admir M. Neshat, Jonesboro, AR (US)

(73) Assignee: The Scott Fetzer Company, Westlake, OH (US)

( * ) Notice: Subject to any disclaimer, the term of this patent is extended or adjusted under 35 U.S.C. 154(b) by 408 days.

(21) Appl. No.: 10/850,519

(22) Filed: May 21, 2004

(65) Prior Publication Data

US 2005/0258115 A1 Nov. 24, 2005

(51) Int. Cl.
*A47F 7/00* (2006.01)

(52) U.S. Cl. .................................... 211/70.7

(58) Field of Classification Search ............... 211/70.7, 211/71.01, 95, 115, 60.1, 65, 69, 81; 30/143, 30/151, 329; D7/601; 206/354
See application file for complete search history.

(56) References Cited

U.S. PATENT DOCUMENTS

| 4,509,651 | A | * | 4/1985 | Prindle ...................... 211/70.6 |
| 5,361,915 | A | * | 11/1994 | Cohen et al. .............. 211/70.7 |
| 5,454,534 | A | * | 10/1995 | Baskas ...................... 248/37.3 |
| 5,494,176 | A | * | 2/1996 | Zallo .......................... 211/70.7 |
| 5,775,518 | A | * | 7/1998 | Connor ....................... 211/70.7 |
| 5,850,784 | A | * | 12/1998 | Conner ........................ 99/485 |
| 6,581,774 | B1 | * | 6/2003 | Galafassi et al. ........... 206/553 |
| 6,920,987 | B2 | * | 7/2005 | Siegel et al. ............... 211/70.7 |

* cited by examiner

*Primary Examiner*—Sarah Purol
(74) *Attorney, Agent, or Firm*—Dennis B. Haase

(57) ABSTRACT

A utensil holder for particular, but not exclusive, use in a kitchen environment in which a swivel block is formed with a series of utensil receiving slots. The utensil holder is readily mounted to both horizontally and vertically disposed surfaces by means of a swivel assembly which permits rotation of the utensil holder to a variety of orientations once so mounted.

13 Claims, 3 Drawing Sheets

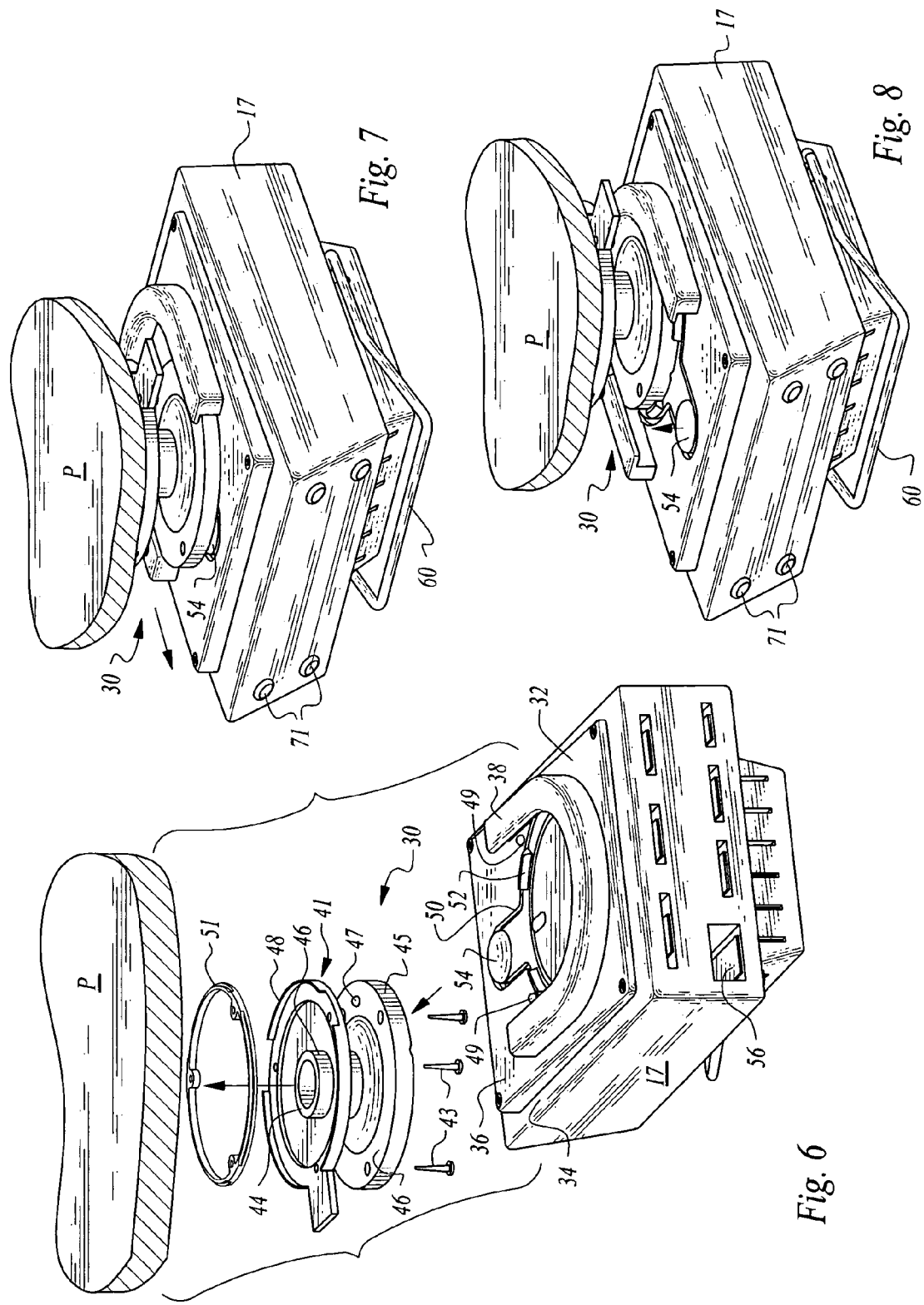

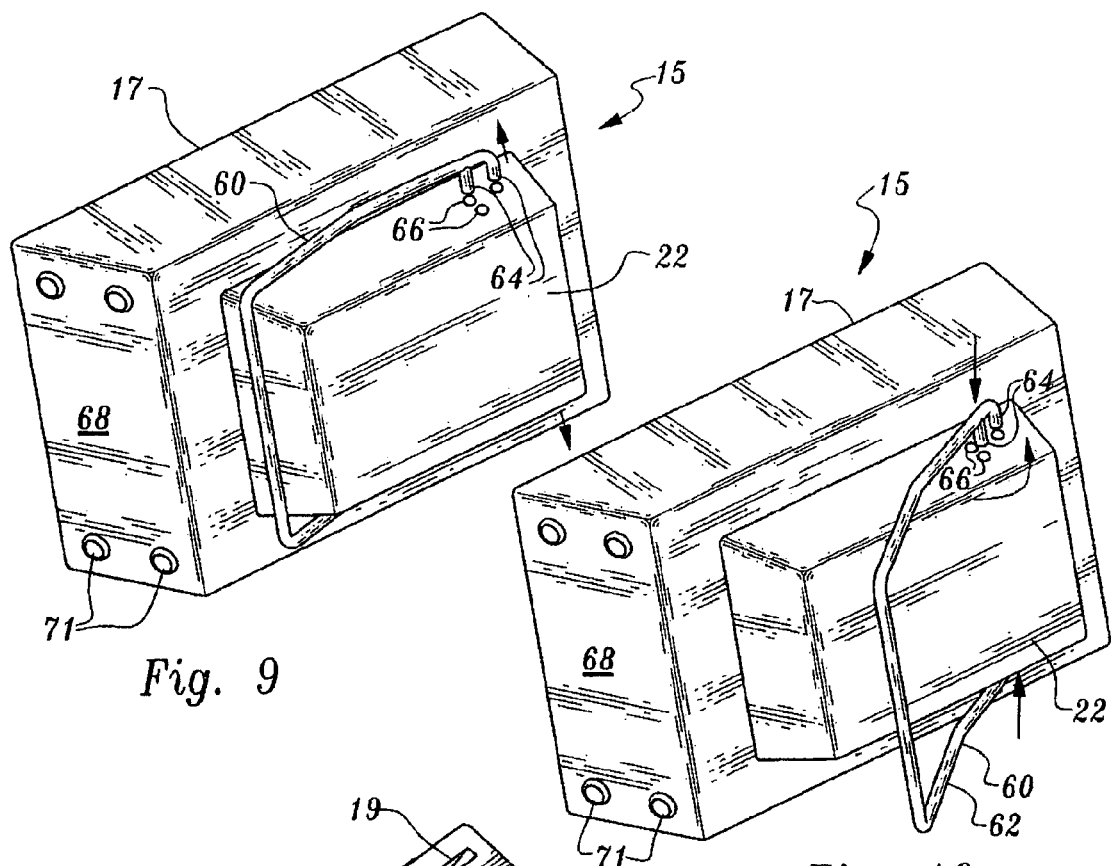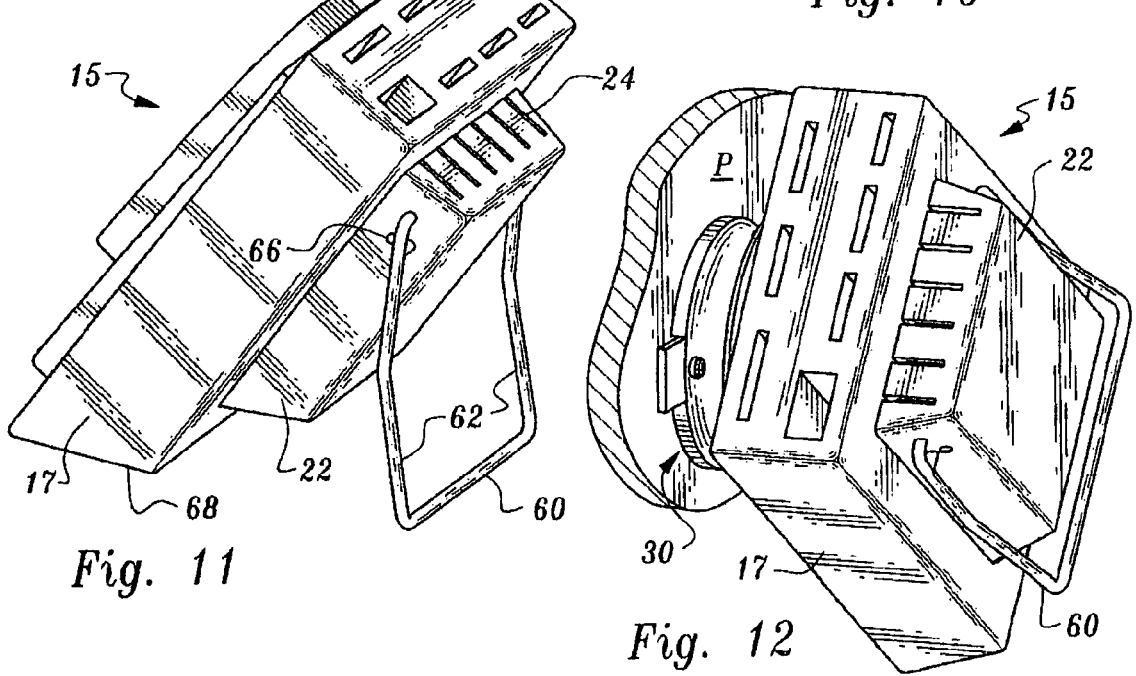

SPACE SAVING SWIVEL BLOCK UTENSIL HOLDER

The present invention relates generally to receptacles for kitchen type utensils, but more particularly to a block for storing knives or the like under a counter and providing access to stored utensils from several angles.

BACKGROUND OF THE INVENTION

1. Field of the Invention

The day of just throwing kitchen utensils into a drawer is, fortuitously, at an end. Particularly, in the case of sharp utensils, e.g., knives, the practice can be potentially dangerous, not to mention unsightly.

Since the popularity of butchers' blocks became wide spread, makers have created a wide variety of such devices, formed or otherwise equipped with a series of slots for receipt and storage of sharp devices, such as knives, in a manner which not only protected folks from inadvertent contact with the sharpened edges of such utensils, but to do so in an aesthetically pleasing manner.

Such blocks come in a variety of shapes, sizes and even styles to fit seamlessly into one's kitchen decor. They are often decorative and, of course, functional, but suffer from a distinct disadvantage, at least in some environments, in that they typically sit on a kitchen counter and take up valuable space.

2. Overview of the Related Art

The quest to free up counter space has not been totally ignored. Today, coffee makers, toaster ovens, can openers, television sets, radios and a variety of other appliances have been redesigned to permit their being mounted under a kitchen cabinet or the like. In most of these cases, the device is permanently mounted so as to be rigidly positioned to face outwardly in order to be operated conveniently from a particular position in a kitchen isle adjacent and/or between cabinets. While these innovations continue to grow in popularity, the venerable wooden block-type knife holder continues to repose on the counter.

SUMMARY OF THE INVENTION

The present invention is an effort to move the knife block off the kitchen counter and into a position where it becomes a highly novel and versatile kitchen accessory.

It is a principal objective of the present invention to provide a device for the storage of sharp kitchen utensils, e.g., knives, which is readily accessible to the user when such utensils are needed and equally convenient for storage of those instruments when not in use.

It is another objective of the present invention to provide a highly versatile, slotted block which readily accepts and stores sharpened kitchen utensils safely in a readily accessible position and, further, is movable to other positions at the instance of the user.

A further objective is to provide for the security of the stored utensils, once positioned in the slots in the block, against inadvertent dislodgment.

Finally, it is a feature of the present invention to provide a block for the storage of kitchen utensils in a manner which is visually attractive and provides a stylish accent to any kitchen or similar room.

The foregoing, as well as other objects and advantages of the present invention will occur to those skilled in the art upon reading the following Detailed Description of the Present Invention, when taken in conjunction with the drawings, wherein:

BRIEF DESCRIPTION OF THE DRAWINGS

FIG. 6 is an exploded view of the swivel features of the utensil holder of the present invention, demonstrating the interrelationship of the various parts of the swivel assembly;

FIG. 7 is a rear perspective of the utensil holder of the present invention, illustrating the direction of movement in the removal of the block from the swivel disk;

FIG. 8 is a view similar to that of FIG. 7, but highlighting the release tab which permits removal of the block from the disk;

FIG. 9 is a view of the bottom portion of the swivel block which forms a part of the utensil holder of the present invention, emphasizing the placement of a wire leg which is used to stand the block in a useable position when it is free standing on, for example, a kitchen counter;

FIG. 10 is a view similar to that of FIG. 9, but with the wire leg swung outwardly in its support position;

FIG. 11 is a pictorial view of the swivel block in its free standing upright position supported by the wire leg; and FIG. 12 is a pictorial view similar in scope to FIGS. 1, 7 and 8, but illustrating the utensil holder as it would be oriented when mounted to a vertical panel.

DETAILED DESCRIPTION OF A PREFERRED EMBODIMENT

Figure 1:
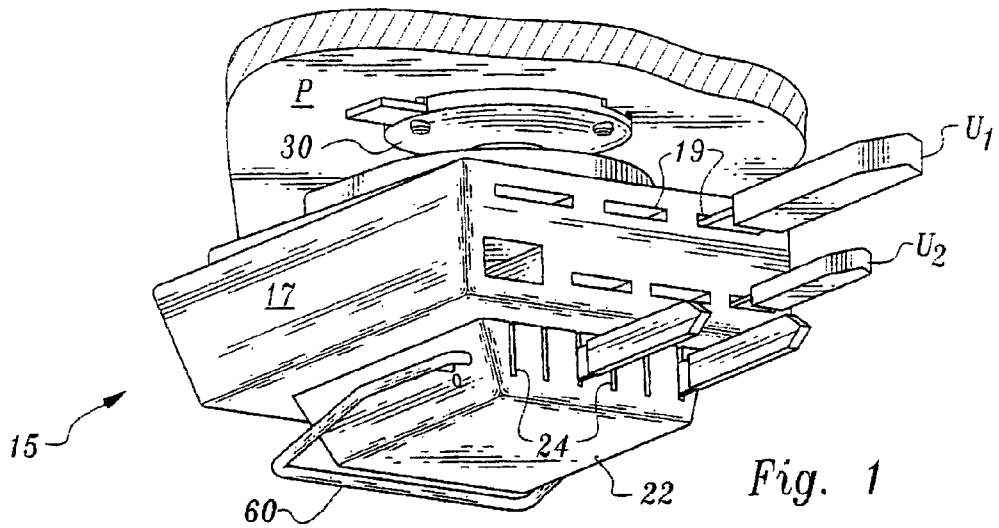
FIG. 1 is a pictorial representation of the utensil holder of the present invention, shown in perspective, and illustrating various novel features thereof.

With reference now to the drawings, and at least initially to FIG. 1, a novel utensil holder assembly constructed in accordance with the present invention is illustrated in its preferred configuration at 15.

The utensil holder of the present invention is distinguished by its versatility, in that it may assume a variety of orientations, including being free standing, or mounted under a cabinet, and even to the vertical face of a cabinet, while preserving its functional utility and innate attractiveness in virtually any location which the user may elect.

In keeping with these objectives, the utensil holder, which, in its illustrated case, is intended to removably receive knives, scissors or the like, includes a utensil receiving main block 17. The block 17 is formed with a series of utensil receiving recesses in the nature of slots 19, and a couple of representative utensils are shown at $U_1$ and $U_2$.

As a means of expanding its capacity and, thus, its utility, depending from the main block 17 (as seen in FIG. 1) is an auxiliary block 22, which block 22 is of a lesser dimension than the main block 17. It will be appreciated that the auxiliary block 22 may be formed integrally with, or attached to, any one of several well known ways, without departure from the invention.

Utensil receiving slots 24 are formed, or otherwise provided, in the auxiliary block 22. The slots 24 are preferably smaller than the slots 19 and receive smaller utensils. The slots 24 are preferably oriented so as to open in the same direction as the slots 19 in order that the utensil $U_3$ and $U_4$ disposed in the slots 24 are accessible from the same general position. The blocks 17 and 22 may be formed as a single unit, or formed as modules, and engaged by any one of several well known methods.

Figures 2, 3:
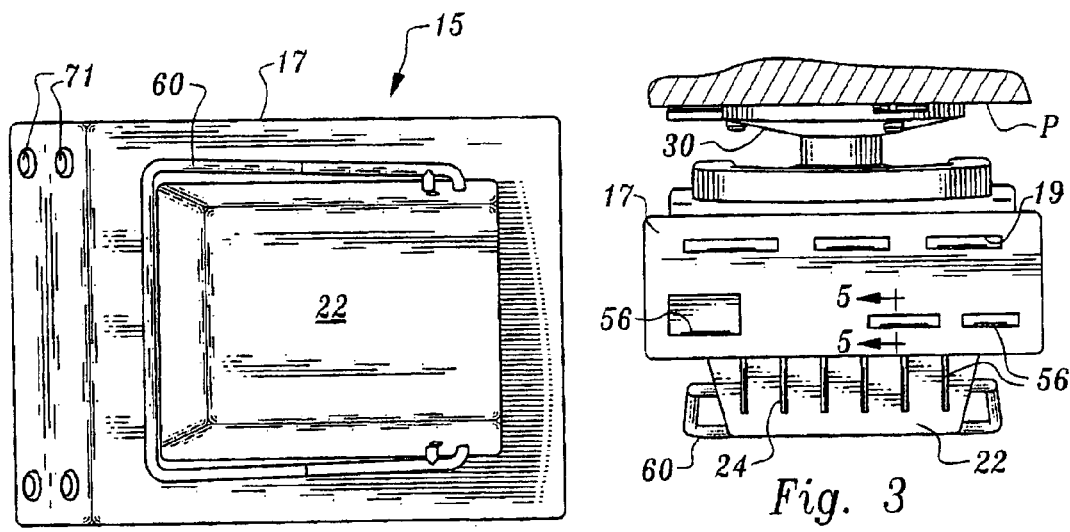
FIG. 2 is a bottom plan view of the utensil holder of FIG. 1.
FIG. 3 is a side elevation of the face of the utensil holder of FIG. 1.
Figures 4, 5:
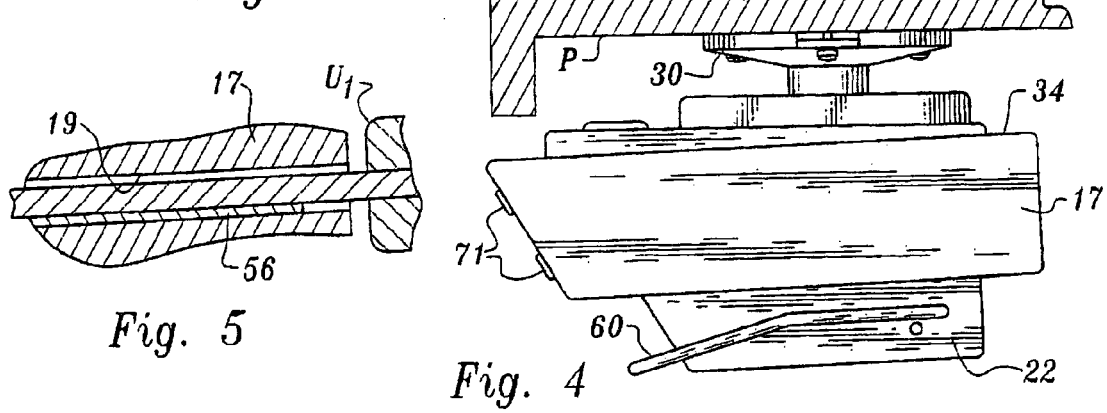
FIG. 4 is right side elevation of the utensil holder of FIG. 1.
FIG. 5 is a partial sectional view of a typical slot in the utensil holder of FIG. 1, showing certain internal features of the present invention.

One of the important features of the present invention is its capacity to comfortably nest, and function in, a variety of orientations. More specifically, the utensil holder of the present invention is readily mounted beneath a cabinet, or shelf, as seen in FIGS. 1, 3 and 4. The holder 15 is equally at home when mounted to the side of a cabinet or wall, as seen in FIGS. 5, 6 and 7. Finally, the utensil holder 15 may be free standing as it is shown in FIGS. 9, 10 and 11.

In order to achieve the objective of securing the utensil holder for relative movement in and to a variety of orientations, a swivel assembly 30 is provided and is, perhaps, best understood when referenced in the exploded view of FIG. 6.

The swivel assembly 30 is comprised of a base plate 32 which is secured to the upper surface 34 of the block 17 by suitable fasteners 36. The base plate is formed, or otherwise provided, with a "U" shaped yoke 38 extending upwardly from the base plate to define a cavity for receipt of an attachment. It will also be observed, as particularly evident in FIGS. 4 through 8, that the base plate is thicker at one end than the other, causing the upper surface 34 to be slanted at an approximate 2° angle. As a consequence, when the utensil holder is mounted beneath a cabinet, as seen in FIG. 4, for example, the utensils face slightly upwardly, thereby inhibiting their accidental dropping from the swivel block.

An attachment in the form of a companion swivel anchor 41 is affixed to a panel P, by fasteners 43. The panel P may be horizontally oriented as it would be as an under cabinet element, or it may be vertically disposed as it would be as a side panel. It is a distinct feature of the present invention that the utensil holder is equally effective in achieving its objectives in either orientation.

The swivel anchor 41 includes a disk 45, which is of such diameter or thickness as to readily slide into and fit snugly within the cavity defined by the yoke 38, while being rotatable therein. The disk 45 is supported on a post 44, which positions the swivel block outwardly from the panel P. A ring 48, also attached to the post 44, is affixed to the panel by the fasteners 43. Additional spacing is provided by at least one spacer 51, which is nested in the top of the ring and moves the ring and, thus, the swivel block assembly further from the panel, as needed.

A locking plate 50 is provided as part of the swivel assembly and is positioned within and beneath the yoke 38 and is formed with a series of forward stops, at least one of which is seen in FIG. 6 at 52, to inhibit inadvertent dislodgement of said yoke relative to said disk when the utensil holder is mounted in its use position. To this end, the plate 50 is relatively flexible and is formed with a tab 54, which extends beyond the circumference of the yoke in order that it can be readily depressed by a user to remove the swivel anchor 41 from the yoke.

In order to permit limited rotation of the swivel block relative to the swivel anchor, the upper surface 46 of the disk 45 is formed with strategically placed limit stop 47, in order that the swivel block 17 may be readily rotated to several convenient positions for storage and/or retrieval of utensils to be stored therein.

The limit stop is in planer alignment with tangs 49 so that the tangs are inhibited from moving past the limit stop, thereby defining the outer limits of rotation of the swivel block as between 5° and 175°. The tangs 49 are so positioned that when the utensil holder is mounted to a vertical surface, the utensil holding slots there will assume a maximum angle of 167° from the horizontal. This results in the utensils being faced slightly upwardly and, thus, inhibited from accidental dropping from the slots.

While every effort has been made to design the utensil holder of the present invention to be as safe as reasonably possible, experience has shown that in use somebody will figure out how to move the block so as to move the longitudinal axis of one or more utensils below horizontal, thereby increasing inertial forces on a utensil stored in the block causing it to slip from the block.

In anticipation of such a remote happening, it is a feature of he invention that each of the slots 19 and 24 of the swivel block 17 are formed, or otherwise provided, with safety inserts 56 (FIGS. 5 and 6). The inserts may be of several forms, including magnetic strips, or in the alternative, friction devices, either one of which would bear on a utensil in a given slot to offer resistance to its being inadvertently dislodged.

It is appreciated that there will be those who do not wish to have their swivel block secured in a particular permanent position. In order to accommodate such wishes, the utensil holder 15 of the present invention is provided with support stand 60 (FIG. 11). The support stand 60 is preferably in a the form of a wire leg 62, the ends 64 of which are removably fitted into recesses 66, in the auxiliary block 22, although it will be apparent that the legs could as easily be fitted into the swivel block should there be no auxiliary block used. The leg 62 is dimensioned to fit comfortably about the auxiliary block 22 when not in use and rotated to its support position, as seen in FIG. 11, when so desired.

In support of this feature, the rear panel 68 is beveled, or slanted, so that when the utensil holder 15 is supported by the leg 62 on a flat surface such as a kitchen counter, the rear panel is coplaner with the counter. In that orientation, the utensils face upwardly and are readily accessed by a user.

In order that inadvertent slippage of the utensil holder in this position is avoided, nibs 71, formed of a suitable non slip material, are provided on the rear panel 68, where they rest, in gripping relation against the counter when the swivel block is sitting thereon.

Having thus described a preferred embodiment of the present invention, together with certain variations thereon, and with the clear understanding that other variations, not specifically described, but well within the understanding of those skilled in the art are within the contemplation of the invention, what is claimed is:

1. A utensil holder, said utensil holder comprising a swivel block, said swivel block being formed with a series of utensil receiving recesses;
   a swivel assembly, said swivel assembly being attachable to a flat surface, said swivel assembly including a yoke, said yoke secured to said swivel block;
   a swivel anchor, said swivel anchor being secured relative to said flat surface, said swivel anchor being secured in and rotatable about said yoke to permit limited rotation of said yoke relative to said swivel anchor to position said swivel block.

2. The utensil holder of claim 1, wherein said swivel assembly includes at least one stop, said stop being disposed beneath and in close proximity to said yoke, said stop being selectively engageable by said swivel anchor when said swivel assembly is fitted into said yoke to thereby inhibit unintended removal of said swivel anchor while permitting relative rotation of said yoke about said swivel anchor to thereby position said utensil holder in a variety of orientations between a storage position and an in use position.

3. The utensil holder of claim 1, wherein said swivel anchor comprises a post, a disk attached to one end of said post, a ring attached to the end of said post opposite said disk, said ring being attachable to a stationary panel for mounting the disk in a fixed position relative to said panel; said disk being so dimensioned as to fit snugly into said yoke while permitting rotation of said yoke, and said swivel block attached thereto relative to said disk.

4. The utensil holder of claim 1, wherein an auxiliary block is provided, said auxiliary block being fixed to said swivel block to provide additional utensil storage capacity.

5. The utensil holder of claim 2, wherein said swivel assembly includes a position plate, said position plate being formed with said stop, said position plate being relatively flexible such that depression of said position plate causes said stop to be moved out of engagement with said swivel anchor.

6. A utensil holder, said utensil holder comprising a swivel block, said swivel block being formed with a series of utensil receiving recesses, safety inserts provided in said recesses to secure utensil placement therein against inadvertent displacement;
a swivel assembly, said swivel assembly being attached to said swivel block, said swivel assembly including a yoke;
a swivel anchor, said swivel anchor being secured to a fixed panel, said swivel anchor being detachably secured in said yoke to permit limited rotation of said swivel block about said swivel anchor, to thereby position said swivel block for use and, alternatively, for safe storage.

7. The utensil holder of claim 6, wherein a limit stop is provided on said swivel anchor, said yoke being formed with tangs, said tangs being in planer alignment with said limit stops so that rotation of said swivel block is limited by contact between one of said tangs and one of said limit stops.

8. The utensil holder of claim 6, wherein said swivel assembly includes at least one stop, said stop being disposed beneath and in close proximity to said yoke, said stop being selectively engageable by said swivel anchor when said swivel assembly is fitted into said yoke to thereby inhibit unintended removal of said swivel anchor while permitting relative rotation of said yoke about said swivel anchor to thereby position said utensil holder in a variety of orientations between a storage position and an in use position.

9. The utensil holder of claim 1, wherein said swivel assembly is selectively detachable from said swivel anchor to permit said swivel block to be used as a free standing unit.

10. The utensil holder of claim 9, wherein a leg is provided, said leg being detachably connected to said swivel block and rotated away therefrom to provide support for said swivel block in its free standing position.

11. The utensil holder of claim 10, wherein an auxiliary block is provided, said auxiliary block being fixed to said swivel block to provide additional utensil storage capacity, said leg being connected to said auxiliary block.

12. The utensil holder of claim 1, wherein said swivel assembly includes a base plate; said yoke being mounted to said base plate; said base plate being wedge shaped such that said swivel block is angled upwardly when mounted to a horizontal surface.

13. The utensil holder of claim 7, wherein said swivel block is rotatable between 5° and 175°.

* * * * *